Patented Oct. 17, 1950

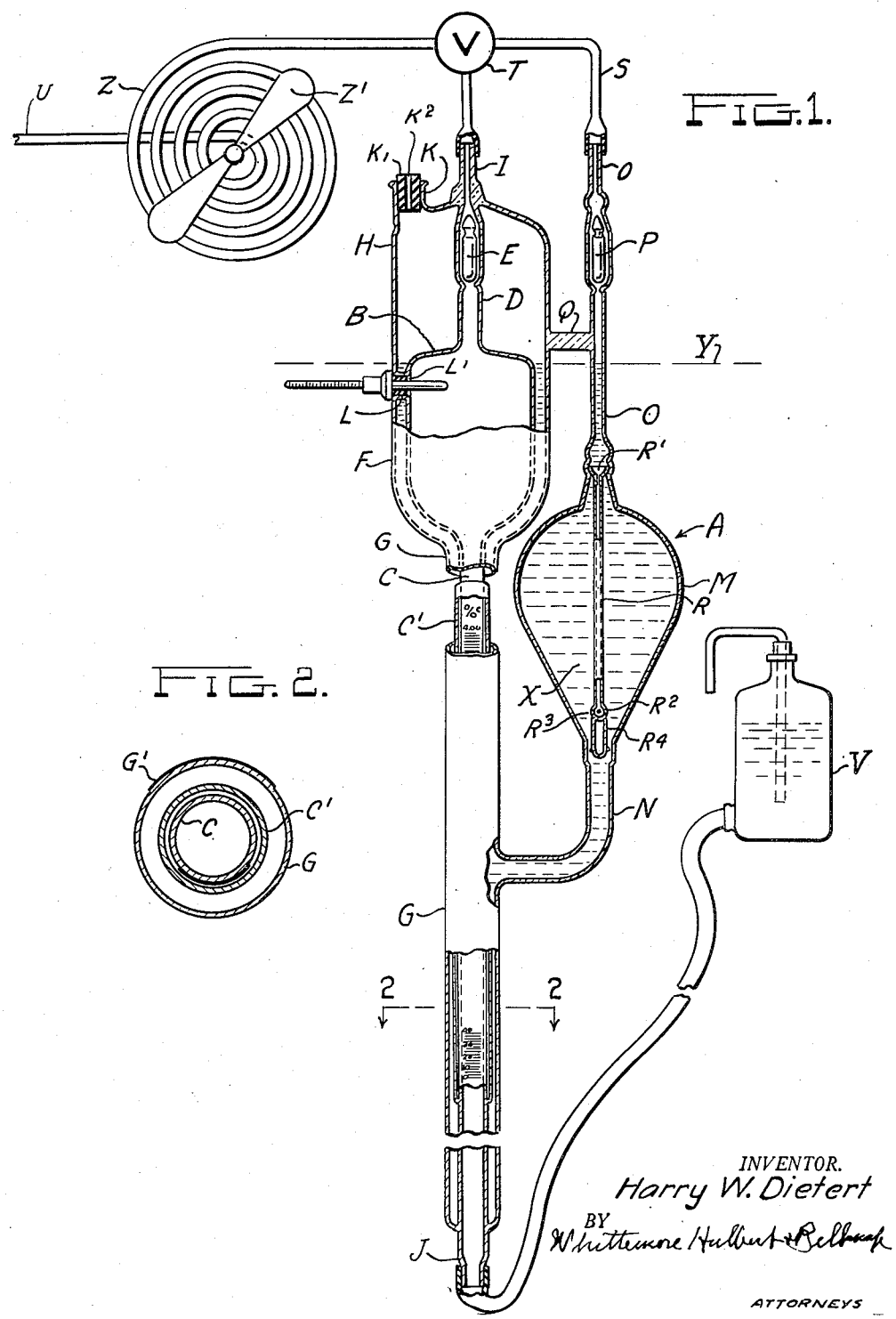

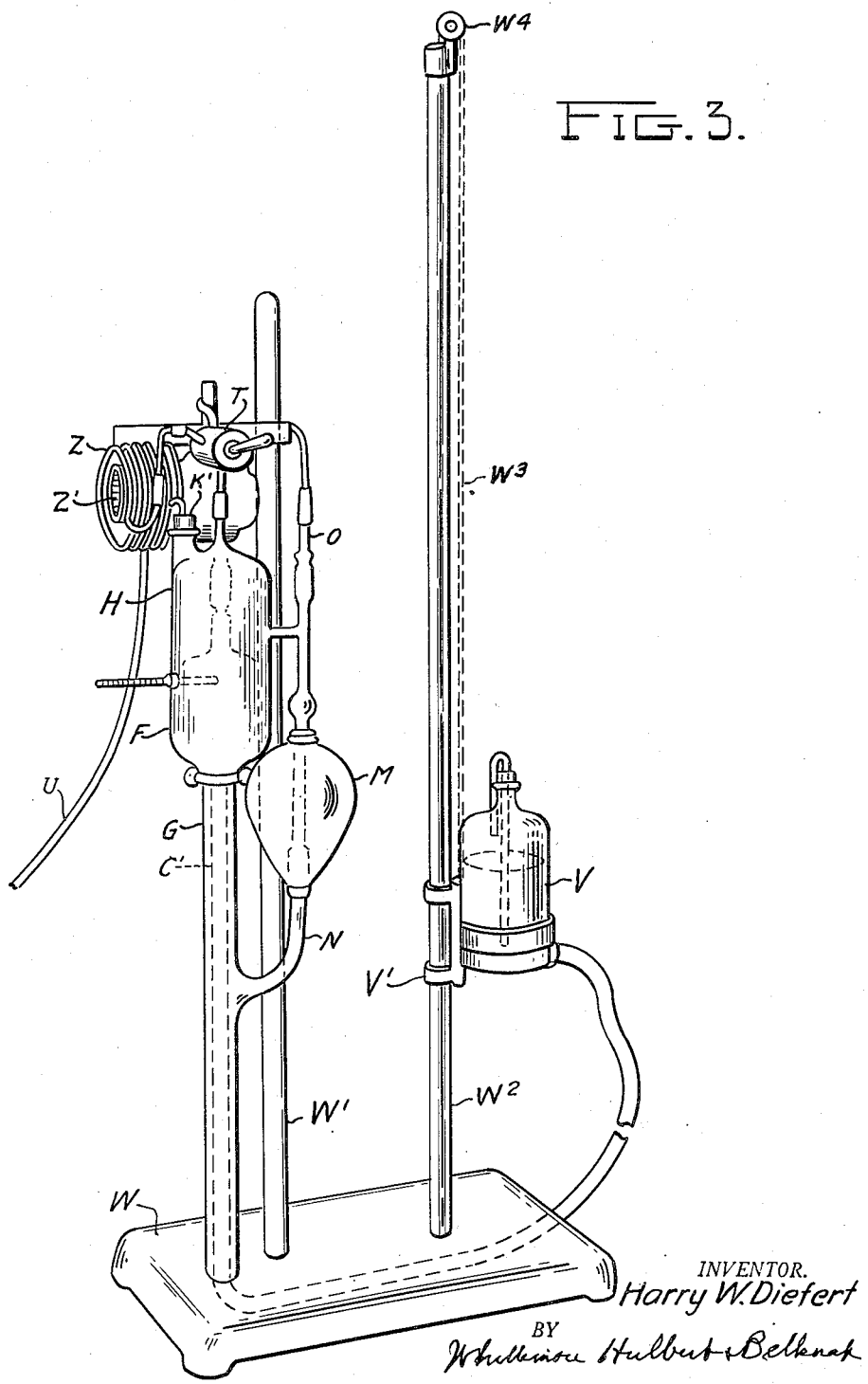

2,526,337

UNITED STATES PATENT OFFICE 2,526,337

APPARATUS FOR ANALYSIS OF GASES

Harry W. Dietert, Detroit, Mich., assignor to Harry W. Dietert Company, Detroit, Mich., a corporation of Michigan Application January 8, 1948, Serial No. 1,204

8 Claims. (Cl. 23—254)

The invention relates to apparatus for the quantitative analysis of gases by volumetric measurement and it is the object of the invention to obtain a construction which will accomplish this purpose with greater accuracy. With apparatus of this general character the gaseous mixture to be analyzed is first introduced into a burette and its volume accurately measured. The mixture is then transferred to an absorption chamber for the elimination of one or more of its constituents after which the remnant is returned to the burette and its reduced volume measured. Thus the difference in volume of the two measurements determines the exact volume of the removed constituent. If desired the burette may be calibrated to give a direct reading in percentage of the constituent removed.

As is well understood the volume of gas is affected by both its temperature and its pressure. Uniform pressure in the two volumes measured may be obtained by balancing them with atmospheric pressure, but uniform temperature is not as easily secured. Thus the incoming gases may be either slightly above or below the temperature of the measuring burette, which will produce a corresponding change in its temperature. On the other hand, the temperature of the absorption vessel may differ from that of the burette particularly where a liquid absorption material is used. Another cause of a difference in temperature between the burette and the absorption vessel is by differential absorption of radiant heat. Whatever the cause of such difference in temperature the effect will be the same, that the volume of a given weight of gas in the one will be different from that in the other. This results in a certain inaccuracy in the percent of gas being tested for inasmuch as the volumetric method of determination reads the change in volume of the gas due to absorption of a particular constituent.

To overcome this source of error in quantitative analysis of gases, I have devised a construction in which the burette is completely surrounded by the liquid absorption medium. This insures the same temperature in the volumes measured, respectively, before and after absorption of the removed constituent. A further improved feature is that the absorption liquid is transferred back and forth between the jacket surrounding the burette and the vessel in which absorption takes place. To secure still further accuracy, I have provided a heat exchange device by means of which the temperature of the gases entering the burette is equal or very nearly equal to that of the surrounding atmosphere. These various features are incorporated in the apparatus illustrated in the accompanying drawings in which Fig. 1 is a sectional elevation of my improved apparatus;

Fig. 2 is a cross-section on line 2—2, Fig. 1; and

Fig. 3 is a perspective view showing the mounting for the apparatus and the water bottle or displacement means used in connection therewith.

My improved apparatus may be used either for the analysis of mixed gases or for the determination of the quantity of a particular constituent of any material such, for instance, as the carbon content of metals. I have, however, only illustrated the portion of the apparatus through which the gaseous mixture is passed. As shown, A is a burette which is formed with a large diameter portion B and a smaller diameter depending calibrated portion C. There is also an upward small diameter extension D from the portion B which contains a float check valve E for preventing upward passage of liquid thereby. Surrounding all of the portions just described is an outer jacket which includes a portion F of larger diameter than the portion B to form an annular space thereabout. A smaller diameter portion G surrounding and spaced from the portion C and a portion H, which is an upward closed top extension of the portion F surrounding the portion D and having a capacity equal to or greater than that of the burette. The portion D of the burette merges into a tube I extending upward above the top of the portion H. At the lower end the portion C merges into a tube J extending below the jacket portion G. There is also a tubular inlet K for the chamber within the portion H and the tubular inlet L for the chamber within the portion B, which extends outward through the wall of the portion H. These inlets are for access to the respective chambers but are normally closed by stoppers K' and L'. The stopper K' has a vent $K^2$ therein for communication between the chamber in the jacket and the external atmosphere. The stopper L' preferably has a thermometer therethrough and which registers the temperature within the portion B of the burette.

At one side of the structure above described and preferably slightly below the large diameter portion F of the jacket is a pear-shaped vessel M for containing an absorption liquid X. This vessel at its lower end emerges into a tube N which is connected into the portion G of the jacket. At its upper end the vessel M connects with a tube O which, in one portion, thereof, contains a check valve P similar to and at the same level as the check valve E in the tube D. The whole structure is preferably formed of glass and an integral brace Q connects the tube O to the portion F of the jacket. Within the vessel M is a separate tubular member R which at its upper end has a spherical enlargement R' seated in a correspondingly shaped portion of the tube O. The lower end of the tube R has an enlarged spherical portion $R^2$ provided with a circumferential series of small perforations R³ for forming gas jets. A hollow portion R⁴ below the portion R³ forms a float for counterbalancing a portion of the weight of the member R when submerged in liquid. This valve seats when subjected to a pressure at or above atmosphere, but when subjected to a pressure slightly below atmosphere will rise from its seat. As the absorption liquid, such for instance as a solution of potassium hydroxide KOH, is of a corrosive nature the calibrated portion C is protected by a surrounding tube C' of glass or other transparent material. This forms a sealing engagement so as to prevent access of the liquid to the markings which might otherwise obliterate the same. The calibrations are thus primarily observable through the transparent absorption liquid and tube C'. However, to increase the distinctness a white strip G' is preferably placed at the rear of the jacket portion G to form a background.

The tubes I and O are connected to each other by a conduit S which contains a valve T, which valve in one position closes the conduit S and couples the tube I with the conduit U extending from the source of gas to be analyzed. This valve also has in one position a vent passage for connecting the tube I with the external atmosphere. The tube J is connected with displacement means such as the so-called water bottle V. The absorption liquid X normally fills the vessel M and also the portions G and F of the jacket surrounding the burette.

The apparatus as thus far described is preferably mounted on a suitable standard which, as shown in Fig. 3, comprises a base plate W, an upright rod W' rising therefrom and to which the glass members are attached and a tubular upright W² on which the water bottle V is mounted. The holder V' for the water bottle is slidable upon the tube W² and has a chain W³ attached thereto passing upward and over a pulley W⁴ downward into the tube with a counterweight attached to the downward portion. Thus the water bottle may be raised or lowered and will be held in any adjusted position by friction.

*Operation*

The burette is first filled with liquid from the water bottle up to the check valve E and the air or gas displaced is permitted to escape through the air vent into the valve T. This valve is then adjusted to connect the tube I with the conduit U from the source of gas and the water bottle is lowered to draw in gas into the burette. The valve T is then adjusted to cut off communication from the conduit U to the tube I and also to momentarily connect the latter tube with the external atmosphere so as to equalize the pressure of the gas within the burette to that of atmosphere, which causes the leveling liquid from the water bottle V to come to the zero reading on the burette. The valve T is next turned to subject absorption liquid to atmospheric pressure and the absorption liquid will come to level Y. The valve T is again adjusted to connect the tube I with the tube O after which the water bottle is raised to expel the gas from the burette into the absorption vessel M. This will expel liquid from the absorption vessel displacing it into the jacket surrounding the burette and upward into the chamber within the portion H of said jacket. It is to be understood that this absorption liquid X is selected according to the gaseous constituent to be absorbed and in case this is carbon dioxide, CO², a suitable liquid will be an aqueous solution of potassium hydroxide KOH. Before the liquid can be displaced from the vessel M, the gas must pass through the jet apertures R³ and will, therefore, bubble up through the liquid in said vessel the carbon dioxide constituent being absorbed. The other constituents will collect above the liquid in the vessel M and as before described will force said liquid into the jacket surrounding the burette. The water bottle is then again lowered to drain the water from the burette creating a vacuum which raises the tubular member R allowing gas to escape around seat R' and which draws the gas back from the vessel M into the burette. Inasmuch as the vessel M and the burette have both been exposed to the liquid absorbent they will be of the same temperature so that the temperature of the gas returned to the burette will be the same as that of the gas first measured therein. Consequently, any error which might be due to difference in temperature of the two gaseous volumes measured will be eliminated.

The water bottle V is placed at such a level that the absorption liquid in the tube O again comes to the line marked at Y which corresponds to atmospheric pressure. Thus the gas is again brought back to atmospheric pressure. The decrease in gas volume due to absorption of CO² gas is shown by new level of water in burette stem C. Percentage of gas absorbed is read from burette scale. The reading is multiplied by a factor which corrects for barometric pressure and temperature.

To obtain still greater accuracy, I preferably equalize the temperature of the gaseous sample to be tested with that of the surrounding atmosphere. This may be accomplished by passing the gas from its source through a heat exchange device such as a spiral coil or tube Z before it is connected to the valve T. A fan Z' adjacent to this coil causes a continuous circulation of air therethrough with the result that the temperature of the gas when it enters the burette is exactly or nearly the same as that of the external atmosphere.

What I claim as my invention is:

1. In a gas analyzing apparatus, a burette, a vessel for containing a liquid gas absorption and heat exchange medium, a jacket surrounding and spaced from said burette, a conduit connecting said burette to said vessel, and a conduit connecting said vessel with said jacket.

2. In a gas analyzing apparatus, a burette, a vessel for containing a liquid gas absorption and heat exchange medium connected to said burette, a jacket surrounding and spaced from said burette having a passageway connecting with said vessel to form a receiving chamber for heat exchange liquid when displaced from said vessel, thereby equalizing the temperature of the burette and the vessel, and means for successively drawing gas to be analyzed into said burette displacing it from said burette into said vessel to absorb a constituent of the gas and to displace by the unabsorbed constituent the liquid from said vessel into said jacket and finally returning the unabsorbed gas to the burette and the liquid to said vessel.

3. In a gas analyzing apparatus, a burette provided with gas introduction and displacement means, a jacket surrounding said burette, an absorption vessel having a passageway connecting with said jacket, both said vessel and jacket adapted to contain a liquid gas absorption and heat exchange medium, a valve at the upper end of said burette and conduit means between said valve and the lower end of said absorption vessel for conducting gas when displaced from said burette and discharging the same through the liquid in said absorption vessel into the space above the same, whereby a constituent of the gas will be absorbed and the unabsorbed portion of said gas will displace said liquid from said vessel into said jacket, thereby maintaining said burette and absorption vessel at substantially the same temperature.

4. In a gas analyzing apparatus, a burette provided with liquid displacement means for the gas therein, a jacket surrounding said burette and forming an annular space therebetween, an absorption vessel having a passageway connecting with said jacket, both said vessel and a major portion of the annular space in said jacket adapted to contain a liquid absorption and heat exchange medium, a valve at the upper end of said burette, and conduit means between said valve and absorption vessel for conducting gas when displaced from said burette and discharging the same through the liquid in said vessel into the space above the same, whereby a constituent of the gas will be absorbed and the unabsorbed gas will displace liquid from said vessel into said jacket, thereby maintaining said burette and absorption vessel at substantially uniform temperature so that the gas return from said absorption vessel to said burette through said conduit means will be at substantially the same temperature as when first in said burette.

5. In a gas analyzing apparatus, a burette provided with liquid displacement means for the gas therein, a jacket surrounding said burette, an absorption vessel having a passageway connecting with said jacket, both said vessel and jacket adapted to contain a liquid gas absorption and heat exchange medium, a valve at the upper end of said burette, conduit means between said valve and absorption vessel for conducting gas when displaced from said burette and discharging the same through the liquid in said vessel into the space above the same whereby a constituent of the gas will be absorbed by the liquid and the unabsorbed portion will displace the liquid from said vessel into said jacket, thereby maintaining said burette and absorption vessel at substantially the same temperature, a conduit through which gas is delivered from its source into the burette, and heat exchange mediums for equalizing the temperature of the gas in said conduit with that of the external atmosphere before its introduction into the burette.

6. In a gas analyzing apparatus, a burette having a large diameter gas holding chamber and a depending small diameter calibrated portion, a jacket surrounding both large diameter and small diameter portions of said burette and spaced therefrom to form an annular chamber therebetween, a vessel for absorption liquid positioned at one side of said jacket below the large diameter portion and adjacent to the small diameter portion thereof said vessel having at its lower end a passageway communicating with said small diameter portion of the jacket, a tubular upward extension of said vessel, and an integral brace connecting said extension with the large diameter portion of the jacket to form a rigid structure.

7. In a gas analyzing apparatus, a burette having a large diameter gas holding portion and a depending small diameter calibrated portion, a tube extending upward from said large diameter portion and a float check valve in said tube, a jacket surrounding said burette having large and small diameter portions respectively surrounding the large and small diameter portions of the burette and spaced therefrom to form an annular chamber therebetween, an upward extension of the large diameter portion of said jacket surrounding said tube and merging therewith at its upper end, the lower end of the burette merging with the lower end of said jacket, a vessel for absorption liquid positioned at one side of said jacket located below the large diameter portion thereof and adjacent to the small diameter portion, a tube extending upward from said absorption chamber and containing a float check valve in said tube at the level of the float check valve in the tube of said burette, an integral tube connecting the lower end of said absorption chamber with the small diameter portion of said jacket, and an integral brace connecting the upwardly extending tube of said absorption vessel with said jacket, the upward extension of said jacket forming a chamber for receiving liquid displaced from said vessel.

8. In a gas analyzing apparatus, a burette having a large diameter gas holding portion, a depending small diameter calibrated portion, an upwardly extending tube from said gas holding portion and a float check valve in the upper portion of said tube, an integral transparent jacket surrounding said burette and having large and small diameter portions respectively surrounding the large and small diameter portions of the burette and spaced therefrom to form an annular chamber therebetween, the large diameter portion of said jacket having an upward extension surrounding said tube and merging therewith at its upper end, a vessel for an absorption liquid located at one side of said jacket below the large diameter portion thereof and adjacent to the small diameter portion thereof, the lower end of said vessel having an integral tubular connection with the latter, a tube extending upwardly from said vessel, an integral brace connecting said tube with said jacket, a float check valve in said tube at the level of the float check valve in said burette tube, and a tube within said vessel forming at its upper end a spherical check valve in the upwardly extending tube from said vessel, the lower end of the tube within said vessel having a bulbular portion with gas jet apertures therein and a closed hollow portion extending downward from said bulbular portion into the tubular connection between said vessel and jacket to limit lateral deflection of said tube.

HARRY W. DIETERT.

REFERENCES CITED

The following references are of record in the file of this patent:

UNITED STATES PATENTS

| Number | Name | Date |
|---|---|---|
| 717,654 | Arndt | Jan. 6, 1903 |
| 1,448,901 | Moreland | Mar. 20, 1923 |
| 1,719,864 | Zimmerman | July 9, 1929 |
| 2,397,846 | Dietert | Apr. 2, 1946 |

FOREIGN PATENTS

| Number | Country | Date |
|---|---|---|
| 22,303 of 1895 | Great Britain | Nov. 22, 1895 |
| 665,799 | France | Sept. 23, 1929 |
| 685,731 | France | Nov. 28, 1929 |
| 107,590 | Germany | Oct. 6, 1898 |
| 436,027 | Germany | Oct. 22, 1926 |